United States Patent
Elsherbini

(12) 
(10) Patent No.: US 6,536,403 B1
(45) Date of Patent: Mar. 25, 2003

(54) DIRECT DRIVE ROTARY ENGINE

(76) Inventor: Magdi M Elsherbini, 3250 Oakhurst Ave. Apt. 6, Los Angeles, CA (US) 90034

( * ) Notice: Subject to any disclaimer, the term of this patent is extended or adjusted under 35 U.S.C. 154(b) by 0 days.

(21) Appl. No.: 09/966,925

(22) Filed: Sep. 27, 2001

(51) Int. Cl.[7] ................................................ F02B 53/00
(52) U.S. Cl. ...................... 123/243; 418/148; 418/264; 418/266
(58) Field of Search .................... 123/243; 418/148, 418/264, 266; 60/39.44

(56) References Cited

U.S. PATENT DOCUMENTS

| | | | | |
|---|---|---|---|---|
| 3,637,332 A | * | 1/1972 | McAnally, III | 123/243 |
| 3,863,611 A | * | 2/1975 | Bakos | 418/264 |
| 3,929,105 A | * | 12/1975 | Chisholm | 123/243 |
| 3,955,540 A | * | 5/1976 | Blanchard | 418/148 |
| 4,353,337 A | * | 10/1982 | Rosaen | 123/243 |
| 5,711,268 A | * | 1/1998 | Holdampf | 123/243 |
| 5,758,617 A | * | 6/1998 | Saito | 123/243 |
| 6,237,560 B1 | * | 5/2001 | Saito | 123/243 |

FOREIGN PATENT DOCUMENTS

| | | | | |
|---|---|---|---|---|
| FR | 999836 | * | 2/1952 | 123/243 |
| FR | 1084004 | * | 1/1955 | 123/243 |
| FR | 1260660 | * | 4/1961 | 123/243 |
| FR | 1345300 | * | 10/1963 | 123/243 |
| FR | 1377548 | * | 9/1964 | 123/243 |
| IT | 355444 | * | 6/1938 | 123/243 |
| IT | 515189 | * | 2/1955 | 123/243 |

* cited by examiner

Primary Examiner—Thomas Denion
Assistant Examiner—Thai-Ba Trieu

(57) ABSTRACT

A direct-drive rotary engine having a rotor housing, the rotor housing having an interior wall structure which defines an open interior of the engine compartment, including an air intake region, a compression region, a combustion region, an expansion region and an exhaust region therein, in which is rotatably disposed a cylindrical rotor assembly coaxially fixed to an engine shaft. The rotor receives a plurality of slidable and retractable sliding walls in a radial arrangement, respectively at positions substantially equal spaced on circumference of said rotor. The sliding walls include a pair of compression rods which are pressures biased to the surrounding inner wall structure of the rotor housing during the rotation of the rotor. The reciprocating movements of the sliding walls define the working chambers of the engine as the rotor rotates, dividing the rotor housing into plurality of sweeping airtight chambers, so that the Otto cycle are carried out once for each sliding wall during a complete revolution of the rotor.

4 Claims, 4 Drawing Sheets

DIRECT DRIVE ROTARY ENGINE

FIELD OF INVENTION

The present invention relates to direct drive rotary internal combustion engine, and in particular a direct drive, rotary internal combustion engine, that is simple, durable, light weight and foolproof, that can provide a high torque in lower engine rotation state.

BACKGROUND OF THE INVENTION

The rotary internal combustion engine possess fewer parts, have no valves, light weight, simple in design and balanced, they have superior breathing and therefore greater efficiency.

The rotary combustion engine uses a rotor that revolves around a shaft. The tips of the rotor remain in constant contact with the engine inner walls forming combustion chambers as it rotates; the rotary has four phases in its combustion cycle, which means it is an Otto Cycle engine. They are intake, compression, combustion, and exhaust, unlike the conventional piston engine; the fuel air mixture is swept along, so the four phases take place in different areas of the engine. In a typical rotary engine, the rotor is mounted on a large circular lobe on the engine shaft; this lobe is offset from the centerline of the shaft, and acts like the crank handle on a winch, giving the rotor the leverage it needs to turn the engine shaft. As the rotor orbits inside the housing, it pushes the lobe around in tight circles, turning three times for every one revolution of the rotor.

Typical rotary engines complete one sequence of suction, compression, combustion and exhaust in one rotor eccentric revolution, and therefore there is such disadvantage that a high engine torque is not achieved unless the operation of the engine becomes a high rotation speed. The size of the combustion chamber is limited and therefore the conversion of chemical fuel energy, to mechanical rotational energy, may be less than optimal. Further more a complicated mechanism is needed to cause the rotor to rotate eccentrically with respect to the engine output shaft, which results in increase in cost and decrease in efficiency.

BRIEF SUMMARY OF THE INVENTION

The object of this invention is to overcome the disadvantages of known internal combustion rotary engine.

Another object of this invention is to provide a reliable, low weight, low cost, high output, direct drive rotary engine, by which it is possible to output a high engine torque at low engine speed, that is adaptable to all ranges of engine applications including aviation.

Another object of this invention is to provide a foolproof engine specially when grouped in multi rotor inline arrangement (FIG. 4). Further it will give a new outlook at the productions of miniature rotary combustion engines as will as monster rotary combustion engines for large applications.

In accordance with one aspect of the present invention there is provided a rotary internal combustion engine, comprising a rotor housing within which is mounted a cylindrical rotor co-axially fixed to an engine shaft and adapted to receive a plurality of extendable and retractable sliding walls. The rotor is rotatably mounted inside the rotor housing, a burnt gas pressure bearing surface formed by a wall defining a notch on the rotor adjacent to the blast-guiding hole to efficiently convert it into rotational energy for the rotor.

The fuel/air mixture is ignited using a spark plug or combustion means, exhaust gases are essentially urged from the combustion chambers, such as through an exhaust port.

The burnt gas blast is provided by a blast-guiding hole formed in the rotor housing, ignitor mounted at the end of the blast-guiding hole in the rotor housing, the blast-guiding hole having its length from the position of the hole from which the blast started. Energy from combustion directed along one direction during the combustion cycle of the engine.

The extendable retractable sliding walls are mounted in the rotor in a radial arrangement; springs are positioned under each sliding wall to control their sliding and retracting movements. These sliding and retracting movements define the working chambers of the engine as the rotor rotates. The working chambers are an intake chamber, compression chamber, combustion chamber, expansion chamber and an exhaust chamber, wherein Otto cycle are carried out once for each sliding wall on the rotor each turn of the engine shaft.

In one embodiment of the present invention, there is provided an air/fuel mixture supply using fuel injection means for providing a suitable air/fuel mixture to the compression chamber.

The moving engine parts are adequately lubricated, and those portions of the engine, which are in communication with each other and require to be sealed in order for the engine to operate, are so sealed.

In accordance with another aspect of the present invention, there is provided a rotary internal combustion engine cycle, wherein the operation thereof is defined by the following phases: air/fuel intake phase, compression phase, combustion phase, expansion phase and exhaust phase. All five phases are repeated over for each sliding wall, each 360 degrees of rotation.

Advantages of the present invention are a more efficient conversion of chemical fuels energy to mechanical energy more power to weight ratio and fewer mechanical parts at lower costs.

BRIEF DESCRIPTION OF THE DRAWINGS

FIG. 2b, is a front cross-sectional view of the sliding wall shown in FIG. 2a

DETAILED DESCRIPTION OF THE INVENTION

Figure 1:
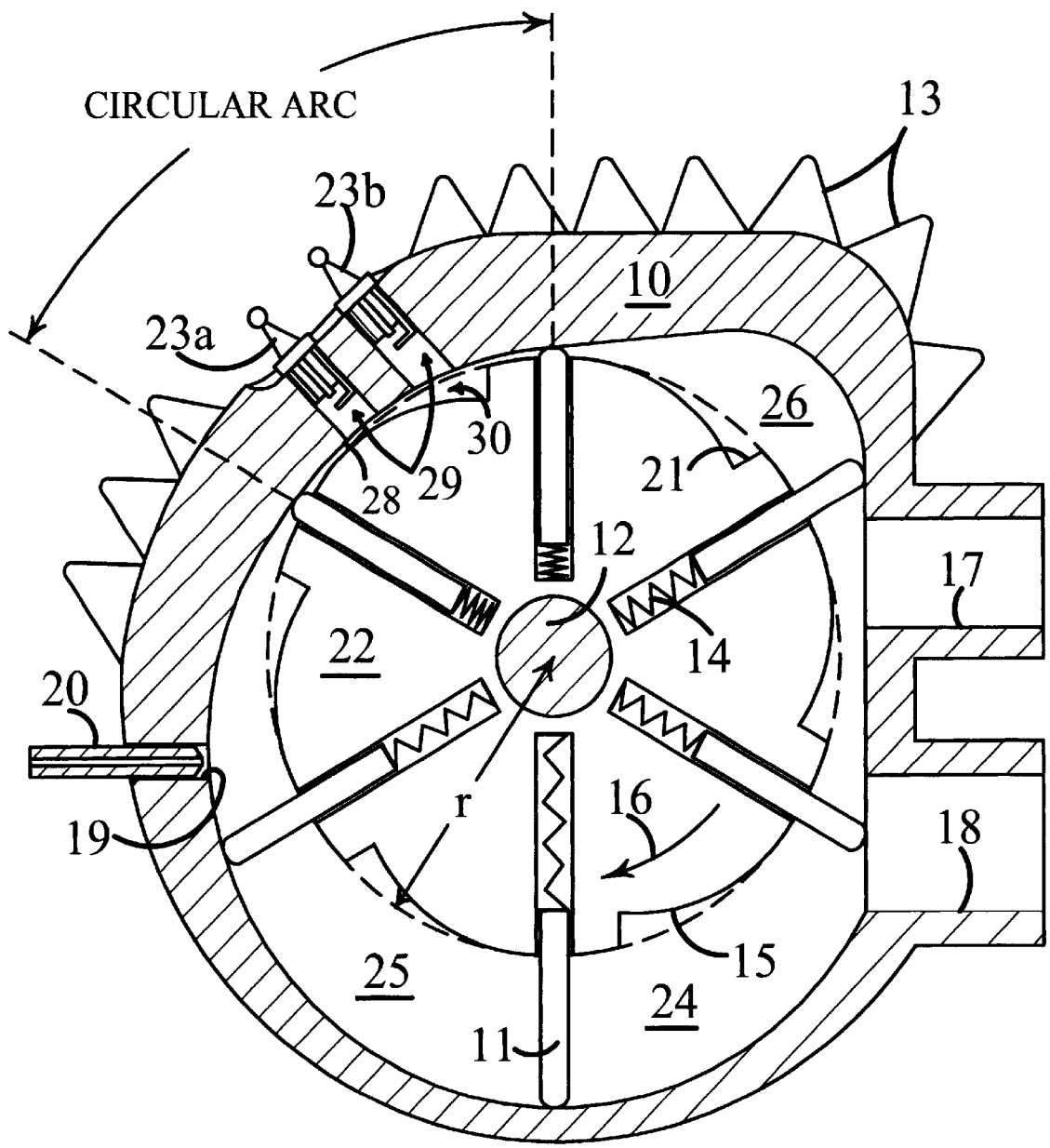
FIG. 1 is a cross section view of one embodiment of the rotary engine according to this invention, in which the rotor has six sliding walls.

FIG. 1 shows one embodiment of the rotary engine according to this invention by the cross section view taken along a plane perpendicular to an engine output engine shaft 12. A cylindrical rotor 22 is fixedly attached to the engine shaft 12. The rotor 22 is adapted to rotate around the axis of the engine shaft 12 together therewith in the direction shown by an arrow 16, inside a rotor housing 10 which is provided with a large number of outside radiator fins 13. The engine shaft 12 is rotatably supported through suitable airtight bearing means (not shown), and the sides portions of the rotor 22 are contacted to the inner side surfaces of the rotor housing in an airtight manner.

As shown, the rotor housing 10 has an inner wall 27, defining an internal engine compartment within which the rotor 22 is rotated. The circumference of the rotor 22 or the circumference face of the rotation locus of the rotor 22 faces to the inner wall 27 of the rotor housing 10.

In the embodiment shown in FIG. 1, the rotor 22 describes the cylindrical rotation locus of radius r, and along its circumference, six sliding walls 11. These sliding walls are slidably attached to the rotor 22, and elastically engaged to the inner wall surface 27, of the rotor housing 10, by respective spring means 14, each of the sliding walls 11 is substantially radial with respect to the rotation axis of the rotor 22. During a revolution of the rotor 22, the sliding walls 11 slide along the inner wall surface 27 with airtight engagement therewith, so that six compartments are always formed. The compartments are formed in such way that two adjacent sliding walls, together with portion of the rotor 22 and the inner wall structure, of the rotor housing 10, define an engine compartment.

The rotor 22 is provided with notches 15, each of which extends in the axial direction and has its curved portion of which depth increases in the rotating direction of the rotor 22. This raising-up portion 21 positioned at the end of the curved portion and extending substantially radially. This raising-up portion 21, of the notch 15, acts as a burnt gas pressure-bearing surface. Wherein the notch 15 on the rotor 22 determine the shape and the size of the combustion chamber 30 adjacent the blast-guiding holes 29, in the rotor housing 10 at the time of the primary then the secondary ignition.

In embodiment of the rotary engine shown in FIG. 1, The intake phase of the cycle starts when the tip of the leading wall 11, passed the intake port 18, at the moment the intake port is exposed to the chamber. The volume of that chamber is close to its minimum. As the rotor rotates, the volume of the intake chamber 24 expands, drawing air into the chamber, until the trailing wall passes the intake port that chamber 24 is sealed off and compression begins.

In this intake engine cycle, it is describable to draw air. The leading sliding wall 11 extends gradually during this intake period creating negative pressure behind it, causing the air to be drawn in the intake chamber24.

The compression cycle starts when the trailing sliding wall 11, has passed through the intake port 18 and the air intake region of the rotor housing 24 is sealed.

The air, which has been drowned and accommodated between these two sliding walls in the intake cycle, must be compressed during the following engine compression cycle. This compression is carried out by the fact that the sliding walls 11, gradually retracts in the radial direction as the rotor 22, rotates.

In the condition shown in FIG. 1, after the trailing sliding wall 11, passed through the intake port 18, and after the air which has been accommodated between the leading and the trailing sliding wall 11 is gradually compressed. Since the distance between the inner wall surface 27, of the rotor housing 10, and the axis of the rotor 22, is gradually decreased.

Fuel is delivered by the mean of fuel injector 20, through fuel injector hole 19, in the compression region 25 in the rotor housing 10.

In the position state of the leading and trailing sliding walls 11, adjacent the sparkplug 23a in FIG. 1, the volume of fuel gas between these sliding walls is made minimum. To this end, a circular arc portion 28, is formed on the inner wall of the rotor housing 10 of which radius is substantially equal to the radius r, of the rotor 22. Therefore, when the two adjacent sliding walls 11, are positioned in this arc portion 28, the sliding walls are in the minimum expansion condition, therefore the mixture is compressed to the maximum level.

In the condition shown in FIG. 1 in which the leading and the trailing sliding walls 11 are in the minimum Expansion State, the fuel mixture therebetween exists substantially within the combustion chamber 30, between these sliding walls in the maximum Pressure State. Combustion is made by means of spark plugs 23a, then 23b.

In accordance with this invention, in order to convert pressure produced by combustion, into rotational energy for the rotor 22, the above-mentioned raising-up portion 21 of the notch 15 acts as a combustion gas pressure-bearing portion.

The spark plugs 23a and 23b are positioned in blast-guiding holes 29 in the combustion region of the rotor housing 10, adjacently to the notch 15, at the time of the primary then the secondary ignition.

In this invention, it is preferable that the radius of the rotation of the rotor 22 is nearly equal to the radius of the circular arc region 28 of the inner wall of the rotor housing 10. As a result, the sliding walls 11 positioned in the arc region 28 are pushed in nearly to the level of the surface of the rotor 22.

In the state illustrated by the leading and trailing sliding walls in the combustion region in FIG. 1, the notch 15, and the arc region 28, determining the notch space define the combustion chamber 30 of the engine.

In the illustrated embodiment, after the leading sliding wall 11 past the last sparkplug 23b, starts to expand quickly from the explosion position so that the volume defined by the leading and trailing sliding walls 11, and the inner wall 27 of the rotor housing 10, is correspondingly increased.

Wherein burnt gas produced by the explosive combustion of the fuel mixture within the combustion chamber 30 is diffused within a pressure diffusion expansion chamber 26 whereby energy generated is maximized to its optimal efficiency in the rotation of the rotor 22.

When and after the leading sliding wall passed through the combustion gases exhaust port 17, the combustion gases is exhausted through the exhaust port 17.

It should be appreciated from the above-mentioned explanation of the construction, and operation, of the illustrated embodiment of this invention. That in this invention during one revolution of the rotor 22, the combustion, that is explosion is carried out by the number of the sliding walls 11, provided on the rotor 22.

Figure 2A:
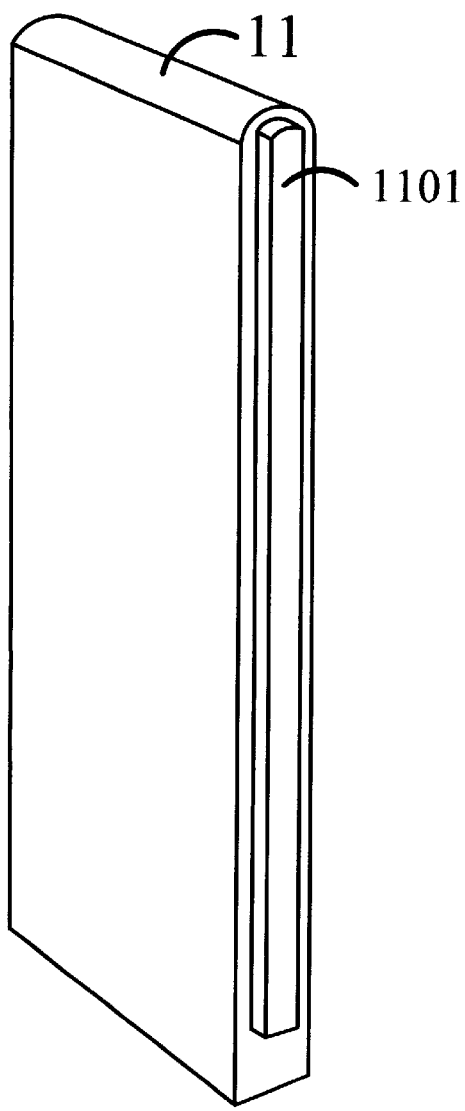
FIG. 2a, is a perspective view of a sliding wall, which may be used in the rotary engine of this invention.

FIG. 2a, is a perspective view of a sliding wall, which may be used in the rotary engine of this invention.

Figure 2B:
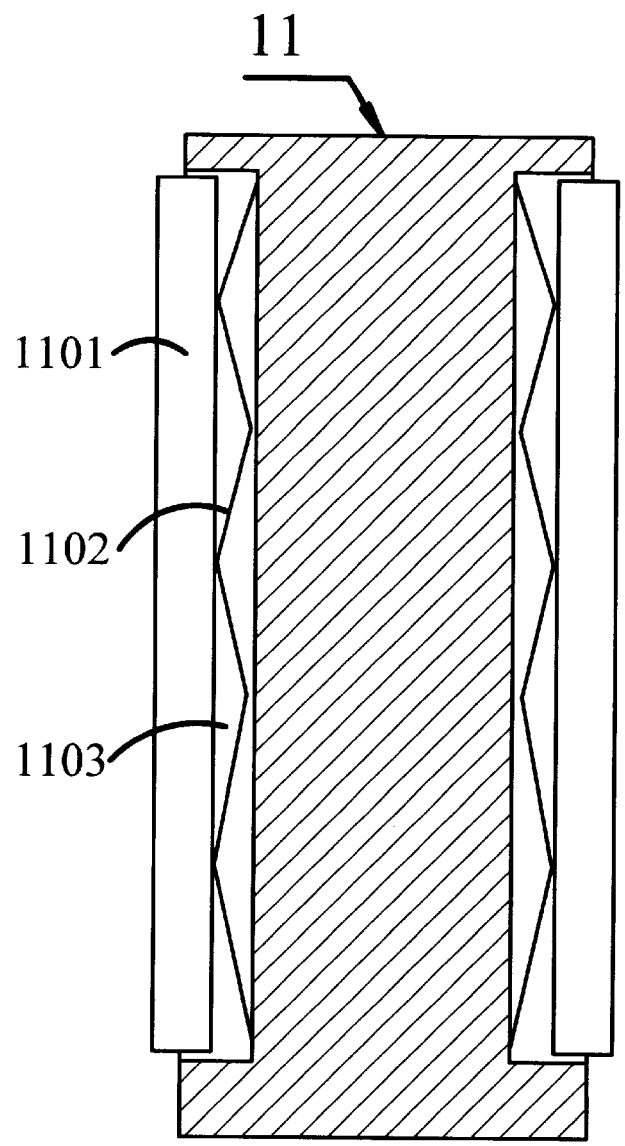

FIG. 2b, is a front cross-sectional view of the sliding wall shown in FIG. 2a, with compression rods 1101 extending out of matched openings 1103 along the sides of the sliding wall 11, wherein the compression rods 1101 are pressure biased. Spring means 1102 positioned inside the opening 1103 and behind the compression rods 1101, so that the compression rods are elastically contacted to the mating wall structure of the rotor housing creating an air tight condition along the sealing edges of said sliding walls.

Figure 3:
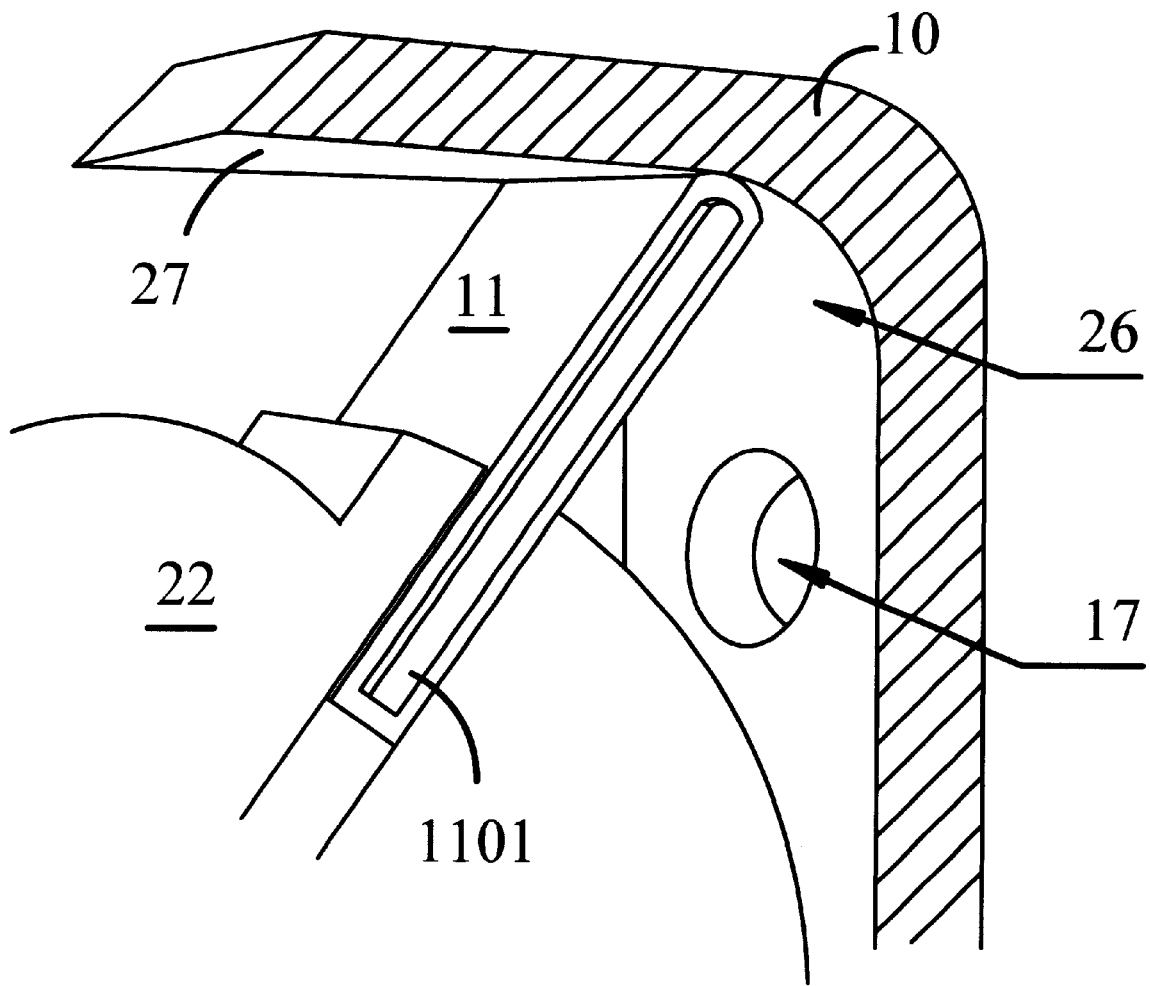
FIG. 3 schematically shows a perspective partial view of a leading sliding wall approaching the exhaust port 17

FIG. 3 schematically shows a perspective view of a leading sliding wall 11 extending out from the rotor 22 approaching the exhaust port 17 in the expansion region of the rotor housing, wherein a compression rod 1101 is shown along one side of sliding wall 11.

Figure 4:
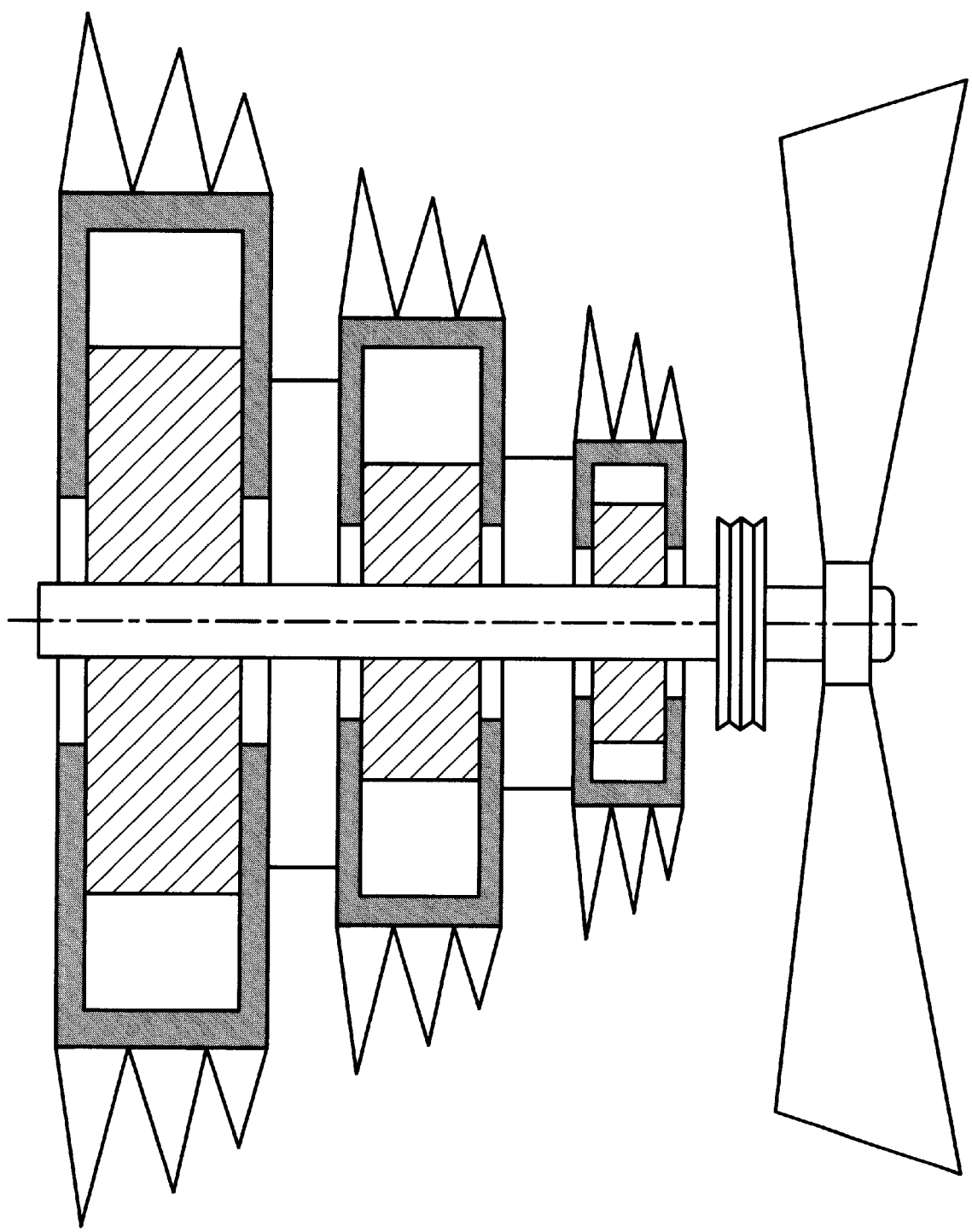
FIG. 4 is a cross-sectional schematic side view of a preferred embodiment of the present invention showing view of multi rotor arrangement, which may be used in the rotary engine of this invention.

FIG. 4 is a cross-sectional schematic side view of a preferred embodiment of the present invention showing view of multi rotor arrangement, which may be used in the rotary engine of this invention.

It should be apparent from the above that the function of the direct drive rotary engine as internal combustion engine, depends for the most part on the ability of the sliding walls to create and maintain an air tight condition between the sweeping engine chambers while executing the engine cycles.

The compression rods acts like piston compression rings on a piston in reciprocating engine the engine will be inoperative without the piston rings, the same rule applies to the compression rods in the rotary engine.

That to be understood that the sliding walls has to be pressure biased at its contact points with the inner wall structure of the rotor housing in order for the Otto cycle to take-place.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A direct drive rotary engine comprising:

a rotor housing including an interior wall structure which defines a partially open interior;

at least one rotor rotatably mounted within the rotor housing and coaxially fixed to an engine shaft;

said engine shaft co-axially disposed in said rotor housing;

said rotor having a plurality of radially extending reciprocating sliding walls; extending from a periphery of said rotor and structured to move relatively to the interior wall structure of said rotor housing;

said sliding walls provide a pressure seal, in relation with said interior wall structure of said rotor housing;

at least one ignitor positioned in a blast-guiding hole adjacent the rotor, in the combustion region of said rotor housing;

at least one fuel injector positioned in fuel injection hole adjacent the rotor, in the compression region of said rotor housing;

said rotor having a plurality of notches, each notch being located between two adjacent sliding walls, each notch faces the ignitor at an ignition point during rotation of said rotor;

a plurality of engine chambers defined about a periphery of said rotor, said chambers being structured to be variably sized and be movably disposed within said open interior in response to said relative rotation between said rotor and said interior wall structure of said rotor housing;

wherein, for each 360 degrees of rotation of said rotor, there is an air intake phase, fuel/air mixture compression phase; combustion phase; expansion phase, and an exhaust gas removal phase;

a combustion chamber formed by the notch on said rotor and two sliding walls, in the combustion region of said rotor housing; and an expansion chamber formed by an extended curve on the inner wall of said rotor housing in the expansion region of the rotor housing and adjacent the combustion chamber, after leading sliding wall has past a last of said at least one ignitor, wherein each of the sliding walls comprises a pair of compression rods each of said rods extending along the center of a narrow side of said sliding walls.

2. The direct drive rotary engine as recited in claim 1, wherein the compression rods are pressure biased.

3. The direct drive rotary engine as claimed in claim 1, further comprising an exhaust port through said rotor housing, adjacent the expansion chamber.

4. The direct drive rotary engine as claimed in claim 1, further comprising an intake port through said rotor housing, adjacent the exhaust chamber.

\* \* \* \* \*